United States Patent Office 2,702,328
Patented Feb. 15, 1955

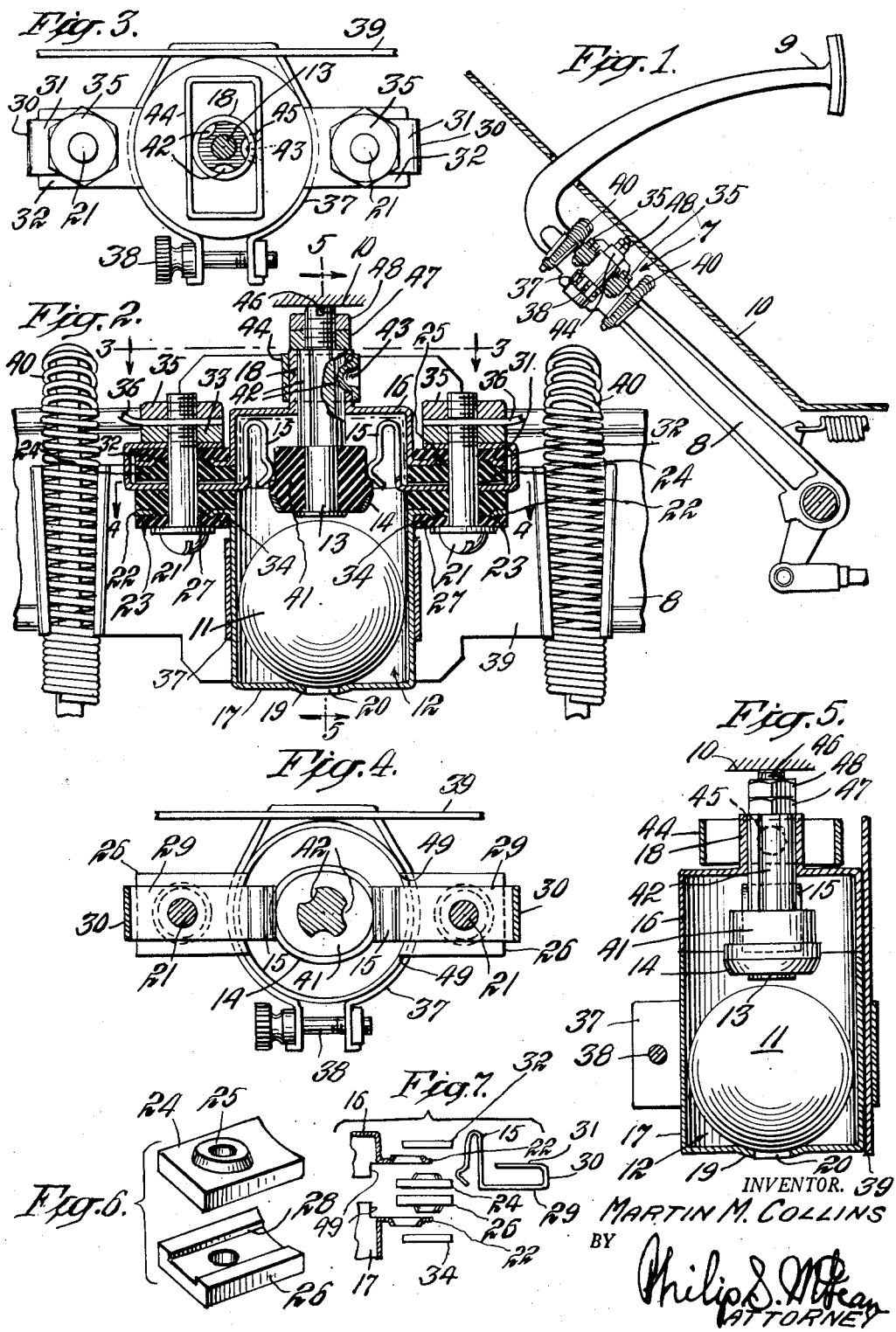

2,702,328

INERTIA SWITCH

Martin M. Collins, New York, N. Y.

Application September 22, 1953, Serial No. 381,677

6 Claims. (Cl. 200—61.53)

The invention herein disclosed relates to inertia switches for use on motor vehicles to effect the sounding of a horn or warning device or for operating a "sander" or the like.

These switches may be attached to the brake pedal, accelerator pedal or other control element.

Objects of the invention are to provide a switch of this character and for these purposes which will be of simple, practical, rugged construction, consisting of but few parts, readily accessible and adapted to be produced and assembled at low cost.

Particular objects of the invention are to manufacture the parts in such way that they will form a dustproof switch enclosure and interlock and be secured in proper relation by the mere act of assembly.

Special important objects of the invention are to provide means for adjusting the switch to operate according to different degrees of impetus; that is, so as to operate quickly and easily or slower and more sluggishly, as may be required or desired.

Other desirable objects attained by the invention and the novel features of construction through which the purposes of the invention are attained are set forth and will appear more fully in the following specification.

The drawing accompanying and forming part of the specification illustrates a present practical embodiment of the invention. Structure, however, may be modified and changed as regards the immediate illustration, all within the true intent and scope of the invention as hereinafter defined and claimed.

Fig. 1 in the drawing is a side elevation of the inertia switch as applied to the shank of a brake pedal, with parts broken and shown in section;

Fig. 2 is an enlarged and broken part vertical sectional view of the switch as applied to the brake pedal and showing it in the normal position of the parts;

Fig. 3 is a plan and part horizontal sectional view as on the plane of line 3—3 of Fig. 2;

Fig. 4 is a broken horizontal sectional view on substantially the plane of line 4—4 of Fig. 2;

Fig. 5 is a broken vertical sectional view on substantially the plane of line 5—5 of Fig. 2;

Fig. 6 is a perspective view of two of the insulating washers for holding the switch contacts;

Fig. 7 is a broken detail.

In the general view, Fig. 1, the switch is indicated at 7 mounted on the shank portion 8 of a brake pedal 9 in "off" position as after having been restored to open circuit condition by abutting the foot panel 10 of a motor vehicle.

In the detail view, Fig. 2, the switch is shown as made up of a ball or inertia element 11 freely operable in a cylindrical casing 12 to raise the spindle 13 carrying the contact ring 14 for connecting switch contacts 15.

The ball casing is shown as made up of upper and lower cylindrical sections 16, 17, the upper section having a projecting cylindrical neck portion 18 for guiding the stem 13 and the lower section having a ball centering cavity 19 provided with a drain opening 20.

The two sections are secured together in abutting end-to-end engagement by screws 21, which are utilized also for wire terminal purposes.

The securing of the sections together is effected by providing them with opposed outwardly turned ears or flanges 22 having openings therethrough for free passage of the screws and bossed upwardly and downwardly, as indicated at 23.

The contacts are clamped between insulating washers interposed between the flanges 22.

These insulating washers are made in pairs, as shown in Fig. 6, with the upper washers 24 bossed upwardly at 25 to extend into similar upwardly bossed openings 23 in the flanges 22 of the upper casing section, and the lower washers 26 bossed downwardly at 27 to enter downwardly bossed openings in the fastening flanges 22 of the lower casing section.

The lower washers 26 are further shown channeled in their upper surfaces at 28, Fig. 6, to receive the angularly outstanding legs or base portions 29 of the switch contacts 15. These base portions are shown as extended upwardly at their outer ends, at 30, Figs. 2, 3 and 4, and thence angularly inwardly, at 31, the latter portions overlying insulating washers 32 engaged over the outstanding securing flanges 22 of the upper casing section 16 and directly engaged by the securing nuts 33 on the bolts 21.

Similar washers 34, next to the heads of the screws, underlie the outstanding securing ears 22 of the lower casing section.

The screws are thus both insulated from the casing and one firmly and positively electrically connected with one of the contacts and the other with the other contact.

Other nuts 35 on the upper ends of the screws operate as binding nuts for securing the wires 36 in place.

The casing is shown secured by a surrounding band 37 and screw 38 to a base plate 39 which in turn is held to the side of the brake pedal shank by surrounding helical springs 40.

The contact ring 14 which may be raised by the ball to bridge the stationary switch contacts, is shown as carried by an insulating button or knob 41 fixed on the lower end of the stem or spindle 13 and a special feature of this construction is that both the insulating carrier and ring are oval or elliptical in cross section, as shown in Fig. 4, so as to offer different resistance to the raising action, depending on whether the major or minor axes of the insulator and contact ring are in line with the space across the switch contacts.

In Fig. 4 the parts are located with the major axis of the ellipse across the switch contacts, whereby to offer the greatest resistance to the plunger raising, switch closing action. With the minor axis of the ellipse across the switch contacts the resistance would be a minimum and at an intermediate point the resistance would be of intermediate value.

To control this effect the stem of the movable switch contactor is shown as longitudinally grooved in three places, as indicated at 42, Figs. 2, 3 and 4, and a spring detent 43 is indicated in Figs. 2 and 3 as adapted to extend through the guide collar 18 into one of the flutes or grooves 42 to retain the sliding stem in that one particular relation.

To support the detent or catch 43 in fixed relation, it is shown as carried by one side of a rectangular spring 44 closely fitting over the guide thimble 18 in position with the detent projecting inwardly through a positioning opening 45 in the side of the guide.

In this manner the stem may be guided longitudinally in any one of three different positions, for the easy, medium or hard operation of the switch, but can be shifted from one position to another by simply turning the stem against the pressure of the holding spring 44.

The upper end of the stem may be provided with a head or screw-driver slot such as indicated at 46 in Fig. 2, for effecting the turning adjustments or these adjustments may be accomplished by using the stop nut 47 and lock nut 48 on the upper end portion of the stem as a knob or handle for rotatively shifting the stem.

The switch can thus be readily adjusted for the desired responsive action, so as to close easily or under medium or more heavy or sudden action of the pedal, and once it is set it will continue to operate under such selected action.

The drain opening 20 in the bottom of the casing and the grooves in the sides of the plunger or stem provide passage for air at both ends of the casing when the casing is suddenly moved in relation to the ball, so the clearance between ball and casing may be close enough to prevent rattling.

The parts are few in number, all of simple, rugged construction, readily assembled and interlocking in the act of assembly to secure them in proper relation. The contact parts are protected and enclosed in dustproof condition.

The ball preferably is relatively heavy so as to raise the movable switch element into contact with the rounded lower ends of the opposed switch elements upon any sudden movement of the brake pedal, accelerator pedal or other control member to which the switch is attached. When raised into engagement with the rounded ends of the stationary contacts the movable contact will thereby be supported until pressed back into the lowered position shown in Fig. 2 which, in the case illustrated, would be accomplished by the upper end of the spindle coming up against the underside of the foot panel.

The two sections of the casing may be made from tubing tailored at their abutting ends to provide the outwardly struck ears or flanges 22 and leave slots in the edges of the sections to provide openings for the switch contacts and the inner ends of the washers supporting these contacts. These washers, as will be clear from Fig. 6, may be cut from strips of insulation, with the screw receiving openings punched and bossed as indicated at 25 and channeled as indicated at 28. The inner ends of the companion contact clamping washers 24 and 26 are shown in Figs. 2 and 4 as entering the slots 49 in the meeting ends of the casing sections, so that these washers will be held against turning and will secure the contacts against turning after the securing bolts are in place. This intermeshing engagement between the securing flanges and the post washers assures the parts being properly held together even if the fastening nuts become loosened.

What is claimed is:

1. An inertia switch comprising an upright cylindrical casing, a ball loosely confined for vertical movement in said casing, a vertically operating plunger guided in the top of said casing over said ball and movable upwardly thereby, spaced contacts in the casing above the ball and cooperable contact means carried by said plunger, said contact means including a circuit closing member having upper and lower sections, respectively, of insulating and conductive material successively engageable with said contacts in upward movement of the spindle propelled by the ball and said circuit closing member having portions of different diameter offering greater or less resistance to movement of said member between the contacts, said plunger being rotatable to position different diametrical portions of the circuit closing member thereon in alinement with the contacts in the casing and catch means for slidably maintaining said plunger in different positions of rotatable adjustment.

2. An inertia switch comprising a cylindrical casing, a ball loosely confined in said casing, a plunger guided in the casing over said ball and movable thereby, contact means in the casing and cooperable contact means carried by said plunger, said plunger being rotatable to position different portions of the contact means thereon in alinement with the contact means in the casing and catch means for slidably maintaining said plunger in different positions of rotatable adjustment, said contact means on the plunger being an elliptical contactor and the contact means in the casing being spaced spring contacts adapted to be bridged by said elliptical contactor in the several adjusted relations of the latter.

3. An inertia switch comprising a cylindrical casing, a ball loosely confined in said casing, a plunger guided in the casing over said ball and movable thereby, contact means in the casing and cooperable contact means carried by said plunger, said plunger being rotatable to position different portions of the contact means thereon in alinement with the contact means in the casing and catch means for slidably maintaining said plunger in different positions of rotatable adjustment, said catch means including a spring pressed button and the spindle being longitudinally fluted to receive the tip of said spring pressed button.

4. An inertia switch comprising a cylindrical casing, a ball loosely confined in said casing, a plunger guided in the casing over said ball and movable thereby, contact means in the casing and cooperable contact means carried by said plunger, said plunger being rotatable to position different portions of the contact means thereon in alinement with the contact means in the casing, catch means for slidably maintaining said plunger in different positions of rotatable adjustment, said casing having a guide neck for said spindle provided with an opening in the side of the same and said catch means including flutes in the circumference of the spindle, a detent button projecting through said opening into one of the flutes in the spindle and an open spring engaged over the guide neck and yieldingly supporting said detent button in position projecting through the opening in the guide neck.

5. An inertia switch comprising upper and lower tubular casing sections in abutting end to end engagement having notches in the meeting ends and flanges projecting angularly from said notches, insulating washers entered in said notches and engaging the inner faces of said flanges, spring contacts having base portions clamped between said insulating washers, additional insulating washers engaged over the outer faces of the flanges, said base portions of the contacts having extensions engaged over the outer faces of certain of said additional washers, bolts extending through said washers, flanges and contact bases and extensions, securing nuts on said bolts engaged with said contact extensions, binding nuts on the bolts for securing terminal wires over said securing nuts, said contacts terminating in yieldable spring fingers disposed within the casing, a movable contactor for bridging said spring fingers and an inertia element confined within the lower section of the casing for actuating said movable contactor.

6. A switch of the character disclosed comprising a two-part casing having opposed projecting assembly lugs, stationary switch contacts supported between said opposed lugs, contact screws extending through said lugs and securing the two parts of the casing and stationary switch contacts in assembled relation, insulation separating said contacts and screws from said lugs and the parts of the casing and said contacts being electrically connected with said screws and whereby said contacts and screws are insulated from the casing and the contacts are electrically connected with the screws, enabling said screws to be used as terminals, a contactor movably supported in the casing for cooperation with the stationary switch contacts and an inertia element confined in the casing for operating said contactor.

References Cited in the file of this patent

UNITED STATES PATENTS

| | | |
|---|---|---|
| 2,258,539 | Cosner | Oct. 7, 1941 |
| 2,283,180 | Buchanan | May 19, 1942 |
| 2,553,708 | Harmon | May 22, 1951 |